(12) United States Patent
Davins et al.

(10) Patent No.: US 12,534,061 B2
(45) Date of Patent: Jan. 27, 2026

(54) METHOD AND DEVICE FOR CONTROLLING THE PATH OF A MOTOR VEHICLE TRAVELLING IN A TRAFFIC LANE AND ASSOCIATED VEHICLE

(71) Applicants: AMPERE S.A.S, Boulogne Billancourt (FR); NISSAN MOTOR CO., LTD., Kanagawa (JP)

(72) Inventors: Joan Davins, Guyancourt (FR); Benjamin Le Coq, Saint Pierre de Bailleul (FR); Raphael Quilliard, Guyancourt (FR)

(73) Assignees: AMPERE S.A.S, Boulogne Billancourt (FR); NISSAN MOTOR CO., LTD., Kanagawa (JP)

( * ) Notice: Subject to any disclaimer, the term of this patent is extended or adjusted under 35 U.S.C. 154(b) by 85 days.

(21) Appl. No.: 18/579,069

(22) PCT Filed: Jul. 13, 2022

(86) PCT No.: PCT/EP2022/069539
§ 371 (c)(1),
(2) Date: Jan. 12, 2024

(87) PCT Pub. No.: WO2023/285502
PCT Pub. Date: Jan. 19, 2023

(65) Prior Publication Data
US 2024/0317208 A1 Sep. 26, 2024

(30) Foreign Application Priority Data
Jul. 15, 2021 (FR) ...................................... 2107669

(51) Int. Cl.
*B60W 10/20* (2006.01)
*B60W 30/045* (2012.01)
*B62D 15/02* (2006.01)

(52) U.S. Cl.
CPC .......... *B60W 10/20* (2013.01); *B60W 30/045* (2013.01); *B62D 15/021* (2013.01);
(Continued)

(58) Field of Classification Search
CPC ............... B60W 10/20; B60W 30/045; B60W 2510/207
See application file for complete search history.

(56) References Cited

U.S. PATENT DOCUMENTS 9,731,755 B1 * 8/2017 Moshchuk ............... B62D 6/04
2005/0225477 A1 * 10/2005 Cong ................. B60K 31/0066
342/72
(Continued)

FOREIGN PATENT DOCUMENTS

EP 3 369 634 A1 9/2018
EP 3 738 850 A1 11/2020
(Continued)

OTHER PUBLICATIONS

International Search Report mailed on Oct. 21, 2022 in PCT/EP2022/069539 filed on Jul. 31, 2022, (3 pages).
(Continued)

*Primary Examiner* — Long T Tran
(74) *Attorney, Agent, or Firm* — Oblon, McClelland, Maier & Neustadt, L.L.P.

(57) ABSTRACT

A method for controlling in real time the path of a motor vehicle travelling in a traffic lane includes detecting a corner in the traffic lane, then, when the vehicle enters the corner, determining first and second quantities for a plurality of successive sampling increments, based on state variables characteristic of the movement of the vehicle, determining a first stored value dependent on the first quantity determined in the current sampling increment and one of the preceding sampling increments, determining a second stored value dependent on the second quantity determined in the current sampling increment and one of the preceding sampling increments, saving the first and second stored values determined for each sampling increment, then, when the vehicle exits the corner determining a value of the understeer gradient depending on the saved first and second stored values, and determining a command for the vehicle based on the understeer gradient.

11 Claims, 3 Drawing Sheets

(52) U.S. Cl.
CPC ..... *B62D 15/025* (2013.01); *B60W 2510/207* (2013.01); *B60W 2520/105* (2013.01); *B60W 2520/12* (2013.01); *B60W 2520/14* (2013.01); *B60W 2552/30* (2020.02); *B60W 2710/207* (2013.01)

(56) References Cited

U.S. PATENT DOCUMENTS

| | | | |
|---|---|---|---|
| 2006/0058935 A1* | 3/2006 | Ghoneim | B62D 6/003 180/408 |
| 2018/0297594 A1 | 10/2018 | Takahashi et al. | |
| 2019/0202454 A1 | 7/2019 | Komiyama et al. | |
| 2020/0062069 A1* | 2/2020 | Sorniotti | B60G 17/01908 |
| 2020/0369267 A1 | 11/2020 | Kashiwamura | |
| 2021/0086832 A1* | 3/2021 | Moshchuk | B62D 15/025 |
| 2022/0081028 A1 | 3/2022 | Kvieska et al. | |
| 2022/0089180 A1* | 3/2022 | Kim | B60W 30/09 |

FOREIGN PATENT DOCUMENTS

| | | |
|---|---|---|
| WO | WO 2020/126840 A1 | 6/2020 |
| WO | WO 2021/110423 A1 | 6/2021 |

OTHER PUBLICATIONS

Preliminary French Search Report dated Mar. 25, 2022 in French Application 2107669 filed on Jul. 15, 2021 (9 pages, with Translation of Categories).

Simon Mustaki. "Outils de pre-calibration numerique des lois de commande de systemes de systemes : application aux aides a la conduite et au vehicule autonome", HAL Id: tel-02297892 https://tel.archives-ouvertes.fr /tel-02297892, 2019, XP055714240, 188 pages.

* cited by examiner

METHOD AND DEVICE FOR CONTROLLING THE PATH OF A MOTOR VEHICLE TRAVELLING IN A TRAFFIC LANE AND ASSOCIATED VEHICLE

TECHNICAL FIELD OF THE INVENTION

The present invention is generally concerned with controlling the path of a motor vehicle in order in particular to keep the motor vehicle in a traffic lane during a turn.

It is more particularly concerned with a method and a device for controlling the path of a motor vehicle traveling in a traffic lane.

The invention equally concerns a motor vehicle including a path control device of this kind.

PRIOR ART

Autonomous and semi-autonomous motor vehicles are designed to travel on open roads without intervention by the driver. To this end they are equipped with a series of digital sensors enabling acquisition of data characterizing the status of the motor vehicle and the environment. The motor vehicle is also provided with software enabling analysis of that data. That software uses algorithms to then generate commands in order to steer the motor vehicle. In particular, this software is designed notably to generate a control law controlling an assisted steering system in such a manner as to keep the motor vehicle at the center of the traffic lane. A control law of this kind is conventionally referred to as a Lane Centering Assist (LCA) law.

The control law makes it possible in particular to adjust the turning angle of the steerable wheels of the motor vehicle. This turning angle depends on the curvature of the traffic lane, the speed of the motor vehicle and a parameter known as the understeer gradient that quantifies the behavior of the motor vehicle as it takes the turn. The understeer gradient may be defined as the angle to be imparted to the wheel for the motor vehicle to experience a lateral acceleration of 1 m/s$^2$.

This parameter is not measurable. Moreover, the range of variation of this parameter is fairly large and this can lead to a bad setpoint for the turning angle and therefore to serious off-centering of the motor vehicle when taking the turn.

Patent application FR3104106 describes a method of determining the understeer gradient. That method is based on modification of that quantity relative to a nominal value as soon as oversteer is observed.

However, changes encountered on the path of the motor vehicle, for example changes in the load of the motor vehicle, which have a high impact on the value of the understeer gradient (and therefore on the value of the turning angle) are not taken into account in an instantaneous manner when the motor vehicle is moving.

DESCRIPTION OF THE INVENTION

The present invention proposes to improve the control of the path of a motor vehicle when making a turn by taking into account, in real time, evolutions encountered during the movement of the motor vehicle.

There is more particularly proposed in accordance with the invention a method for controlling the path of a motor vehicle traveling in a traffic lane, comprising steps of:
  detecting a turn in the traffic lane, then, when the motor vehicle enters said turn,
  determining a first quantity and a second quantity for a plurality of successive sampling increments on the basis of state variables characteristic of the movement of the motor vehicle,
  determining a first stored value and a second stored value, said first stored value being a function of the first quantity determined for the current sampling increment and of first quantities determined for at least one of the preceding sampling increments, said second stored value being a function of the second quantity determined for the current sampling increment and of second quantities determined for at least one of the preceding sampling increments,
  saving in memory said first stored value and second stored value determined for each sampling increment, then when the motor vehicle exits said turn:
    determining a value of the understeer gradient as a function of said first stored value and second stored value saved in memory, and
    determining a command for the motor vehicle on the basis of the value of the understeer gradient that has been determined.

Thus, thanks to the invention, the understeer gradient values are determined in a regular manner and in real time while the motor vehicle is moving. The understeer gradient value is more particularly determined and updated from turn to turn throughout the movement of the motor vehicle in the traffic lane. The motor vehicle path control setpoint is therefore advantageously also adjusted in real time. This then makes it possible to keep a motor vehicle as close as possible to the ideal path at the center of the traffic lane (in a straight line as in a turn) without leading to abrupt changes of path. This therefore makes it possible to guarantee the comfort of the occupants of the motor vehicle by preventing jolts on path control changes.

The present invention finds a particularly advantageous application in the case of heavy goods vehicles or utility vehicles the load distribution of which may vary during movement (for example during delivery). The understeer gradient is therefore adjusted throughout the movement of the motor vehicle, taking account of these load modifications and without external intervention.

Other advantageous and non-limiting features of the control method according to the invention, taken separately or in all technically possible combinations, are as follows:
  the first stored value is a function of the sum of the first quantity determined for the current sampling increment and of first quantities determined for at least one of the preceding sampling increments and the second stored value is a function of the sum of the second quantity determined for the current sampling increment and of second quantities determined for at least one of the preceding sampling increments;
  the state variables characteristic of the movement of the motor vehicle are a function of a component of a turning angle of a wheel of the motor vehicle, a curvature of the traffic lane, a speed of movement of the motor vehicle or a wheelbase of the motor vehicle;
  there is also, before the step of detection of the turn, a step of initialization of an understeer gradient value on the basis of a predetermined value;
  the step of determining the value of the understeer gradient is executed from one turn to another turn taken by the motor vehicle;
  there is also a step of correction of the value of the understeer gradient in order to determine an intermediate value of the understeer gradient, said intermediate value of the understeer gradient being determined on the basis of a weighting between the value of the understeer gradient that has been determined and a predetermined value;

the value of the understeer gradient is determined on the basis of a ratio between the first stored value and the second stored value;

there are also provided steps of:

a) determining a first acceleration value and a second value of another acceleration of the motor vehicle, b) determining a difference between the first acceleration value and the second value of the other acceleration, c) if the difference that has been determined is greater than a predetermined threshold, further correction of the value of the understeer gradient based on a correction value that is a function of said difference that has been determined;

the detection of the turn depends on parameters characteristic of the movement of the motor vehicle, at least some of the parameters being chosen from an angle of a front wheel of the motor vehicle, a yaw speed of the motor vehicle, a lateral offset between the center of gravity of the motor vehicle and an ideal path, a transverse acceleration of the motor vehicle or a speed of movement of the motor vehicle;

the first quantity and the second quantity are determined using a recursive least squares method that is a function of state variables characteristic of the movement of the motor vehicle; and the step of determining the command for the motor vehicle includes a substep of determining a component of a turning angle of a wheel of the motor vehicle.

The invention also concerns a motor vehicle comprising a power train, a steering system and a device for real-time path control as introduced above adapted to control the steering system.

The invention also concerns a device for controlling the path of a motor vehicle traveling in a traffic lane including a computer and a memory provided with a database having a finite number of locations, said computer being designed for:

detecting a turn in the traffic lane, then, when the motor vehicle enters said turn, determining a first quantity and a second quantity for a plurality of successive sampling increments on the basis of state variables characteristic of the movement of the motor vehicle, determining a first stored value and a second stored value, said first stored value being a function of the first quantity determined for the current sampling increment and of first quantities determined for at least one of the preceding sampling increments, said second stored value being a function of the second quantity determined for the current sampling increment and of second quantities determined for at least one of the preceding sampling increments, saving in memory said first stored value and second stored value determined for each sampling increment, then when the motor vehicle exits said turn:

determining a value of the understeer gradient as a function of said first stored value and second stored value saved in memory, and determining a command for the motor vehicle on the basis of the value of the understeer gradient that has been determined.

The invention also concerns a motor vehicle including a power train, a steering system and a device for real-time path control as previously introduced adapted to control the steering system.

Of course, the various features, variants and embodiments of the invention may be associated with one another in various combinations provided that they are not incompatible or mutually exclusive.

DETAILED DESCRIPTION OF THE INVENTION

The following description with reference to the appended drawings, provided by way of non-limiting examples, will clearly explain in what the invention consists and how it may be realized.

There has been represented in FIG. 1 a motor vehicle 1 (also referred to hereinafter as "vehicle 1"). This motor vehicle 1 conventionally has four wheels 3, a chassis that in particular supports a drive train (namely an engine and means for transmission of the engine torque to the driving wheels), a steering system (provided for example with a steering column), bodywork elements, and passenger compartment elements.

Figure 1:
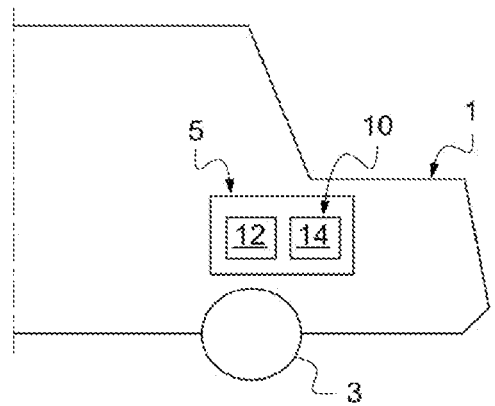
FIG. 1 represents a schematic view of a part of a motor vehicle.

As represented in FIG. 1 the vehicle 1 also includes a control unit 5. The control unit 5 provides command and control of various members of the vehicle 1. For example the control unit 5 is able to receive information from various digital sensors present in the vehicle 1, such as a speed sensor or a sensor measuring a turning angle of the front wheels of the vehicle 1.

The control unit 5 may equally control an actuator coupled to the steering column of the vehicle 1 by communicating to it for example a control setpoint. The control unit 5 includes to this end a path control device 10. The path control device 10 is adapted to generate the control setpoint. For example, in the case of an autonomous or semi-autonomous vehicle the path control device 10 enables a path control setpoint to be generated in order to orient the vehicle 1 or to maintain it in a traffic lane, in particular in a turn of that traffic lane.

Here the control device 10 includes a computer 12 and a memory 14. The memory 14 contains a database. The computer 12 stores in its memory an application consisting of computer programs including instructions the execution of which by the processor enables execution by the computer 12 of the method described hereinafter.

Figure 2:
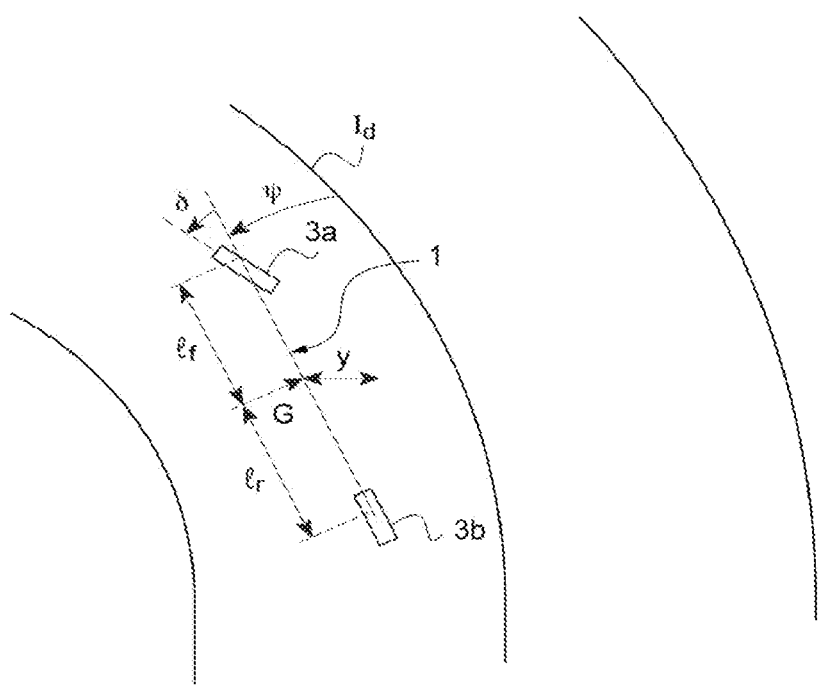
FIG. 2 is a representation of the "bicycle" model applied to the motor vehicle traveling in a traffic lane.

Here the path of the vehicle 1 is modeled by a so-called "bicycle" model. FIG. 2 is a representation of the "bicycle" model applied to the vehicle 1 traveling in a traffic lane. In the context of this model the vehicle 1 is modeled by a frame and two wheels (as for a bicycle): the steerable front wheel 3a and the non-steerable rear wheel 3b.

The equations introduced hereinafter are matrix equations.

The variables considered in this model are as follows:
- a yaw speed, denoted $d\psi/dt$, of the vehicle 1, corresponding to the speed of rotation of the vehicle 1 about a vertical axis through its center of gravity G,
- a bearing angle, denoted $\psi$, corresponding to the angle between the longitudinal axis of the vehicle 1 and the tangent to the path,
- a lateral speed of the vehicle 1, denoted $\dot{y}$, linked to the distance of the center of gravity G of the vehicle 1 from an ideal path $I_d$,
- a lateral offset, denoted y, corresponding to the offset between the center of gravity G of the vehicle 1 and the ideal path $I_d$,
- a rotation speed, denoted $d\delta/dt$, of the front wheel 3a relative to the vertical axis,
- an angle, denoted $\delta$, of the front wheel 3a, that is to say the angle between the front wheel 3a and the longitudinal axis of the vehicle 1, and
- a position error integral that corresponds to the time integral of the offsets of the center of gravity G of the vehicle 1 relative to the ideal path $I_d$ on which it should be, this error integral being denoted:

$$\int -y dt \qquad \text{[Math. 1]}$$

The vehicle 1 is therefore represented by what is commonly termed a state vector (hereinafter "state data X") defined by:

$$X = \begin{pmatrix} d\psi/dt \\ \psi \\ \dot{y} \\ y \\ d\delta/dt \\ \delta \\ \int -y dt \end{pmatrix} \qquad \text{[Math. 2]}$$

According to the "bicycle" model, the equation of the path of the vehicle 1 is given by:

$$\dot{X} = AX + B\delta_{req} + B_\rho \rho \qquad \text{[Math. 3]}$$

where:
- $\delta_{req}$ (in radians, denoted rad hereinafter) is an angle setpoint for the front wheel 3a (thus a control setpoint) in order for the vehicle 1 to remain on or to approach the ideal path $I_d$ in the traffic lane,
- $\rho$ (in m$^{-1}$) is the curvature of the traffic lane (and also the curvature of the path in the "bicycle" model),
- $B_\rho$ represents disturbance data (in particular linked to the curvature of the traffic lane), and
- A represents the dynamic relation with the state data X.

Here the matrix A depends on the respective coefficients $c_f$ and $c_r$ (expressed in Newton/rad) of cornering stiffness of the front and rear wheels of the vehicle 1, the respective distances $I_f$ and $I_r$ between the center of gravity G of the vehicle and the front drive train and between the center of gravity G of the vehicle 1 and the rear drive train 1 (these distances are represented in FIG. 2), the mass m (in kg) of the vehicle 1 and the speed v (in m/s) of the vehicle 1 in the longitudinal direction (also referred to hereinafter as the speed of movement of the vehicle 1).

The coefficients $c_f$ and $c_r$ of cornering stiffness of the wheels are concepts well known to the person skilled in the art. For example the coefficient $c_f$ of cornering stiffness of the front wheels is thus the one that makes it possible to write the equation $F_f = 2 \cdot c_f \cdot \alpha_f$, where $F_f$ is the lateral sliding force on the front wheels and $\alpha_f$ is the turning angle of the front wheels.

In the context of the "bicycle" model a measurement $Y_1$ is also expressed as a function of the state data X by the relation: $Y_1 = C \cdot X$ where C is data comprising measurements from the various digital sensors included in the vehicle 1.

For the remainder of the invention there are also defined:
- a lateral acceleration of the vehicle 1 corresponding to the normal component of the acceleration of the vehicle 1 (thus normal to the path) in the frame of reference tied to the vehicle 1, and
- a transverse acceleration of the vehicle 1 corresponding to the acceleration acting on the vehicle 1 in a manner perpendicular to the direction of movement of the vehicle 1 relative to the frame of reference tied to the ground.

This "bicycle" model is then used in a control law for the path of the vehicle 1 stored in the control unit 5. For example, this control law makes it possible to keep the vehicle 1 at the center of the traffic lane in which the vehicle 1 is traveling in a straight line or in part of a turn.

Figure 4:
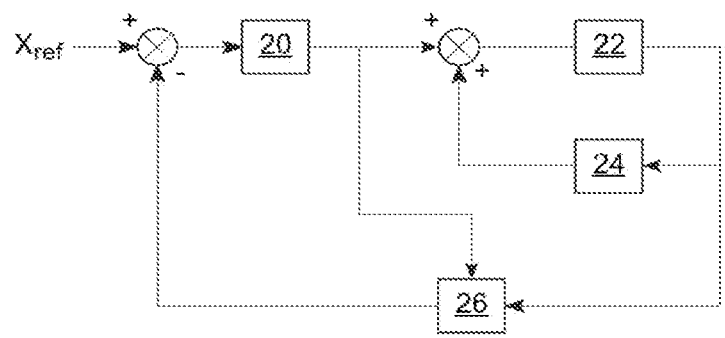
FIG. 4 represents a functional schematic of a closed-loop method of controlling the path of the motor vehicle.

FIG. 4 represents a closed-loop functional schematic of this control law.

In FIG. 4 $X_{ref}$ corresponds to the ideal path of the vehicle 1 in its traffic lane. In practice this is often the path that passes through the center of the traffic lane in which the vehicle 1 is traveling. This ideal path is the one that the control unit 5 requires the vehicle 1 to achieve (or maintain).

To this end the control law takes the form of a looped process. According to FIG. 4, the state of the vehicle 1, and in particular the path of the vehicle 1, is given by an element 22. This element 22 is in practice connected to the control unit 5 that will control the path of the vehicle 1 in such a manner as to satisfy the equations (for the state data X and the measurement data $Y_1$) from the "bicycle" model described above, complying with the turning angle setpoint $\delta_{req}$ for the front wheel.

The functional schematic represented in FIG. 4 also shows the presence of an observer element 26. This element 26 makes it possible to supply an estimate of the state of the vehicle 1. In practice the element 26 is connected to the various digital sensors in the vehicle 1 and therefore receives all the measurements concerning the vehicle 1.

The element 26 also receives from the element 22 information transmitted by the control unit 5 concerning path control.

The element 26 then generates an estimated path of the vehicle 1 using estimated data $X_{est}$. To this end the element 26 generates observation data $L_P$ that groups the measurements concerning the vehicle 1 and variables necessary for the definition of the control law estimated from those measurements. The observation data $L_P$ is a function of the speed of movement of the vehicle 1.

In other words the observation data $L_P$ is determined from the speed of movement of the vehicle 1 concerned. The estimated data $X_{est}$ then satisfies the following equation:

$$X_{est} = (A - L_p C) X_{est} + B\delta_{FBK} + L_p Y_1 \qquad \text{[Math. 4]}$$

where $L_P$ is a gain value associated with the observer element 26.

As represented in FIG. 4 the estimated data $X_{est}$ is then compared to the ideal path $X_{ref}$. The difference between the estimated path and the ideal path is processed by an element 20. This element 20 is adapted to generate a new control setpoint, for example a new control setpoint concerning a component $\delta_{FBK}$ of the turning angle $\delta_{req}$ of the front wheel. To this end the element 20 employs regulation data $K_S$. The new control setpoint concerning the component $\delta_{FBK}$ of the turning angle $\delta_{req}$ of the front wheel is obtained by multiplying the difference between the estimated path $X_{est}$ and the ideal path $X_{ref}$ by the regulation data $K_S$. The new control setpoint is therefore a function of the regulation data $K_S$. This regulation data $K_S$ is in practice expressed in the form of a matrix.

The regulation data $K_S$ is a function of the speed of the vehicle 1. In other words the control law depicted in FIG. 4 uses different values of the regulation data $K_S$, each of these values being associated with a speed of movement of the vehicle 1.

The values of the regulation data $K_S$ associated with each of the speeds of movement concerned are determined when the vehicle 1 is designed. They are therefore fixed before use of the vehicle 1. The control setpoint concerning the component $\delta_{FBK}$ of the turning angle $\delta_{req}$ of the front wheel generated from the regulation data $K_S$ is therefore termed predictive.

FIG. 4 also shows the presence of an anticipator element 24. This element 24 makes it possible in particular to take into account the curvature of the traffic lane by evaluating a component $\delta_{FFD}$ of the turning angle $\delta_{req}$ of the front wheel necessary to follow that traffic lane.

Using the equations introduced to describe the "bicycle" model in a permanent regime, the vehicle 1 being at the center of the turn (ẏ=0, y=0 and dδ/dt=0), the setpoint concerning the component $\delta_{FFD}$ of the turning angle $\delta_{req}$ of the front wheel determined by the anticipator element 24 is written in the following manner:

$$\delta_{FFD} = \rho(L + \nabla_{SV} v^2) \quad \text{[Math. 5]}$$

where:
L (in m) is the wheelbase of the vehicle 1, and
$\nabla_{SV}$ is the understeer gradient specific to the vehicle 1 and defined by the following expression:

$$\nabla_{SV} = \frac{M_f}{C_f} - \frac{M_r}{C_r} \quad \text{[Math. 6]}$$

where $M_f$ and $M_r$ (in kg) are the weights respectively applied to the front drive train and the rear drive train of the vehicle 1.

The anticipator element 24 is also connected to the various digital sensors in the vehicle 1 and therefore receives all measurements concerning the vehicle 1.

As FIG. 4 shows, the angle to be applied to the steering wheel (and therefore the angle setpoint $\delta_{req}$ to be transmitted to the wheel) for the vehicle 1 to move in a turn having a known curvature ρ finally depends on the two components respectively determined by the observer element 26 ($\delta_{FBK}$) and by the anticipator element 24 ($\delta_{FFD}$):

$$\delta_{req} = \delta_{FBK} + \delta_{FFD} \quad \text{[Math. 7]}$$

The invention therefore aims here to determine this angle to be applied to the steering wheel (and therefore the angle setpoint $\delta_{req}$ to be transmitted to the wheel) for the vehicle 1 to move in a turn having a known curvature ρ.

The computer 12 of the control device 10 (and more generally the control unit 5) is adapted to execute the method for controlling the path of the motor vehicle 1.

The method executed by the computer 12 is adapted to control in real time the path of the motor vehicle 1 in the traffic lane, in particular in a turn. Here by the expression "real time" is meant that the path of the motor vehicle 1 can be controlled in a regular manner when the vehicle 1 is moving in the traffic lane.

To this end the computer 12 employs a method including a plurality of steps that are described hereinafter.

Figure 3:
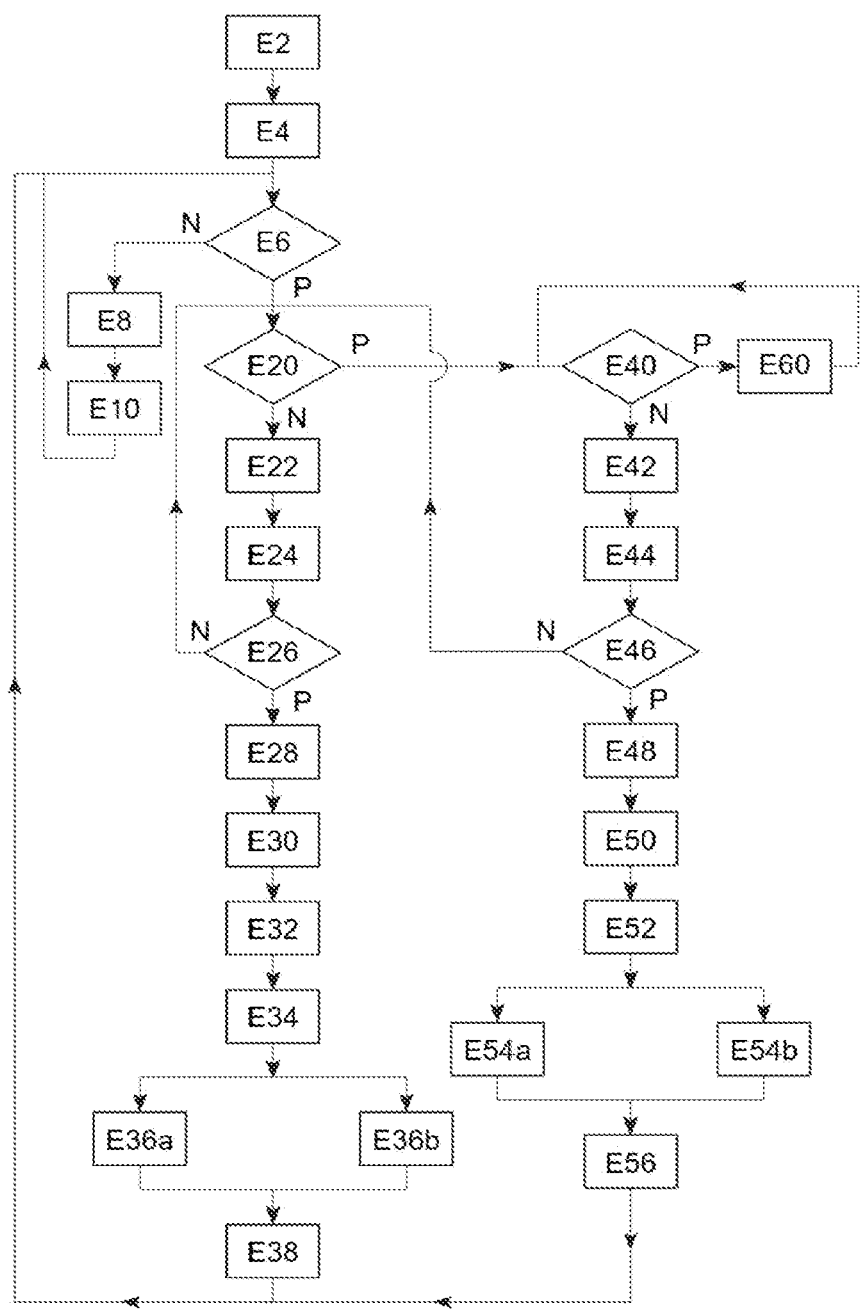
FIG. 3 represents in the form of a flowchart an example of a method according to the invention of controlling the path of the motor vehicle.

The succession of steps employed in the context of this method is represented in FIG. 3 in the form of a flowchart.

As FIG. 3 shows, the method starts in the step E2 in which the motor vehicle 1 takes to the road and begins to move in the traffic lane. It is considered here that the autonomous traffic lane following function has been activated.

In order to determine the turning angle setpoint $\delta_{req}$ when activating this function, the method includes a step E4 of initialization of the understeer gradient value $\nabla_{SV}$ from a predetermined value $\nabla_{SV\_init}$. This predetermined value $\nabla_{SV\_init}$ is for example a default value stored in the memory 14. This predetermined value $\nabla_{SV\_init}$ depends for example on the weights $M_f$ and $M_r$ respectively applied to the front drive train and the rear drive train of the vehicle 1 and on the corresponding stiffness coefficients $c_f$ and $c_r$. The setpoint generated by the control unit 5 concerning the turning angle $\delta_{req}$ is determined on the basis of this predetermined value $\nabla_{SV\_init}$. The predetermined value $\nabla_{SV\_init}$ more particularly enables determination of the component $\delta_{FFD}$ of the turning angle $\delta_{req}$ required. In parallel with this, the observer element 26 estimates the other component $\delta_{FBK}$ of the required turning angle $\delta_{req}$. The turning angle setpoint $\delta_{req}$ on starting up is therefore obtained by summing these two components. This start-up setpoint is then transmitted to the steering system of the motor vehicle 1.

The method then proceeds through steps E6 to E60. These steps E6 to E60 are executed in a loop when the vehicle 1 is moving. These steps are more particularly executed for each successive sampling increment δt of a plurality of sampling increments δt of the time for which the motor vehicle 1 has been moving. This sampling increment δt is for example of the order of 10 milliseconds.

In the sampling increment δt concerned, during step E6, the computer 12 detects if the traffic lane includes a turn.

To detect the presence of a turn in the traffic lane the computer 12 verifies at least the following conditions concerning the characteristic parameters of movement of the motor vehicle 1. These parameters characteristic of that movement are for example the angle of the front wheels, the yaw speed of the vehicle 1, the lateral speed of the vehicle 1, the transverse acceleration of the vehicle 1 or the lateral offset. Alternatively, it could be based on data from map and navigation software.

Here a turn is in particular detected if the angle of the front wheels, the yaw speed of the vehicle 1 and the lateral speed of the vehicle 1 have the same sign. Another condition for detection of a turn relates to the absolute value of the transverse acceleration between a minimum threshold value and a maximum threshold value. The minimum threshold value is for example of the order of 0.84 m/s². The maximum threshold value is for example of the order of 1.5 m/s².

A turn is also detected if the lateral offset is less than a predefined value, for example less than 1 m.

A turn is also detected if the time derivative of the yaw speed is less than a predetermined value for a certain period of time, for example less than 0.05 rad/s² for 1 s.

This turn detection is employed only in the case of a speed of movement of the vehicle 1 greater than a minimum speed of movement of the vehicle 1 threshold, movements at low speed being only slightly representative of the general movement behavior of the motor vehicle 1 in the traffic lane.

If no turn is detected in step E6, that is to say if the vehicle 1 is traveling on a straight portion of the traffic lane, the method continues with step E8. During this step the value of the understeer gradient $\nabla_{SV\_\delta t}$ is equal to a constant value. This constant value is for example the predetermined value $\nabla_{SV\_init}$ stored in the memory 14. Alternatively, this constant value may be a value of the understeer gradient determined for a preceding sampling increment and stored in the database of the memory 14 (this determination is explained hereinafter).

As FIG. 3 shows the method then includes the step E10 during which the value of the understeer gradient $\nabla_{SV\_\delta t}$ determined in step E8 is used to determine the turning angle setpoint $\delta_{req}$ (using the equations introduced above) and therefore the control setpoint for the path of the motor vehicle 1. The anticipator element 24 more particularly uses the value of the understeer gradient $\nabla_{SV\_\delta t}$ determined in step E8 to determine the component $\delta_{FFD}$ of the required turning angle $\delta_{req}$. In parallel with this the observer element 26 estimates the other component $\delta_{FBK}$ of the required turning angle $\delta_{req}$. The turning angle $\delta_{req}$ setpoint is therefore obtained by summing these two components. This setpoint is then transmitted to the steering system of the motor vehicle 1.

The sampling increment is then incremented to execute the steps of the method for the next sampling increment (as indicated above, the method is executed in a regular manner when the vehicle 1 is moving in the traffic lane). The method therefore returns after this to step E6.

If in step E6 the computer 12 detects that the vehicle 1 is traveling in a turn, the vehicle 1 therefore takes the turn that has been detected and the method continues with step E20.

During this step the computer 12 evaluates if, while traveling in the traffic lane, the motor vehicle 1 has traveled in one (or more) turns during a predetermined duration $\tau_{app}$ from starting the engine. In other words, here the computer 12 determines if the vehicle has traveled in a turn (in one or more turns) during, in total, at least this predetermined duration $\tau_{app}$ that will constitute a learning period for the method. This predetermined duration $\tau_{app}$ is for example greater than 30 s, for example of the order of 50 s.

If this is not the case the method continues with step E22 during which the computer 12 determines, for the sampling increment concerned, the values of a first quantity $\phi(\delta t)^T \cdot Y(\delta t)$ and of a second quantity $\phi(\delta t)^T \cdot \phi(\delta t)$ associated with the understeer gradient.

The equation [Math. 4] can more particularly be rewritten in the following form, involving state variables $\phi$ and $Y$ characteristic of the movement of the motor vehicle 1 in its traffic lane:

$$Y(\delta t) = \Phi(\delta t) \cdot \Theta(\delta t) \qquad \text{[Math. 8]}$$

where $$\Theta(\delta t) = \nabla_{SV}, \quad Y(\delta t) = \delta_{req} - \rho L \text{ and } \Phi(\delta t) = \rho v^2 \qquad \text{[Math. 9]}$$

It is then possible to isolate the understeer gradient by writing:

$$\Theta(\delta t) = \left(\Phi(\delta t)^T \cdot \Phi(\delta t)\right)^{-1} \cdot \left(\Phi(\delta t)^T Y(\delta t)\right) \qquad \text{[Math. 10]}$$

where ... $^T$ is the notation corresponding to the transpose of a matrix and ... $^{-1}$ corresponds to the inverse of a matrix.

In practice, during execution of the method according to the invention the computer 12 seeks to optimize the value of the understeer gradient and therefore, using the foregoing equation, to optimize the first quantity $\phi(\delta t)^T \cdot Y(\delta t)$ and the second quantity $\phi(\delta t)^T \cdot \phi(\delta t)$ associated with the understeer gradient.

In step E22, for the sampling increment $\delta t$ concerned the matrices $Y(\delta t)$ and $\phi(\delta t)$ are therefore determined from the measured instantaneous values of the characteristic parameters of the motor vehicle 1 (measurements obtained by the various sensors in the vehicle 1). The characteristic parameters used are in particular the wheelbase of the vehicle 1, the curvature $\rho$ of the traffic lane, and the speed v of movement of the vehicle 1. Note for example that the curvature $\rho$ of the traffic lane is determined from the following equation:

$$\rho = \frac{\text{transverse acceleration}}{v^2} \qquad \text{[Math. 11]}$$

During this step the value $\delta_{req}$ of the turning angle used is that obtained in an open loop and measured in the sampling increment $\delta t$ by the sensor concerned in the motor vehicle 1.

The first quantity $\phi(\delta t)^T \cdot Y(\delta t)$ and the second quantity $\phi(\delta t)^T \cdot \phi(\delta t)$ are then determined on the basis of the instantaneous values of the matrices $Y(\delta t)$ and $\phi(\delta t)$ for the sampling increment $\delta t$ by a recursive least squares method.

As FIG. 3 shows, the method proceeds in step E24. During this step the computer 12 stores a first stored value $\phi^T \cdot Y$ and a second stored value $\phi^T \cdot \phi$ in the database of the memory 14.

The first stored value $\phi^T \cdot Y$ is a function of the first quantity $\phi(\delta t)^T \cdot Y(\delta t)$ determined for the sampling increment $\delta t$ (in step E22) but also of the first quantities determined for the preceding sampling increments. The same goes for the second stored value $\phi^T \cdot \phi$ that is a function of the second quantity $\phi(\delta t)^T \cdot \phi(\delta t)$ determined for the sampling increment $\delta t$ (in step E22) and also of the second quantities determined for the preceding sampling increments.

For example, the first (respectively second) stored value $\phi^T \cdot Y$ (respectively $\phi^T \cdot \phi$) corresponds to the sum of the first (respectively second) quantities determined for all of the sampling increments up to the current sampling increment.

In this case the computer 12 in practice stores the result of the summation of the first stored value memorized for the preceding sampling increment (resulting itself from the sum of the preceding first values stored) and of the first quantity $\phi(\delta t)^T \cdot Y(\delta t)$ determined for the current sampling increment $\delta t$.

Alternatively, the first (respectively second) value $\phi^T \cdot Y$ stored may correspond to the average of the first (respectively second) quantities determined for all of the sampling increments up to the current sampling increment.

It is for example also considered here that on starting the motor vehicle 1 the first quantity $(\delta t)^T \cdot Y(\delta t)$ and the second quantity $\phi(\delta t)^T \cdot \phi(\delta t)$ are zero. The first stored value $\phi^T \cdot Y$ and the second stored value $\phi^T \cdot \phi$ determined in the first sampling increment in a turn therefore depend directly on the instantaneous values of the matrices $Y(\delta t)$ and $(\delta t)$ determined for this first sampling increment in a turn.

The method then continues with step E26 during which the computer 12 determines if the motor vehicle 1 has exited the turn detected in step E6.

If this is not the case, that is to say if the motor vehicle 1 is still in the turn detected in step E6, the method returns to step E20.

On the other hand, if the motor vehicle 1 has exited the turn that it was negotiating the method continues with step E28. This therefore means that at present the motor vehicle 1 is traveling in a straight line.

During this step the computer 12 updates the value of the understeer gradient $\nabla_{SV\_\delta t\_act}$ that is used to determine the component $\delta_{FFD}$ (and therefore the turning angle $\delta_{req}$ setpoint). It should therefore be noted here that the understeer gradient value is updated only if the motor vehicle 1 is traveling in a straight line (and therefore between two consecutive turns). The understeer gradient value is advantageously updated from one turn to another, while the motor vehicle 1 is moving. This in particular makes it possible to prevent sudden changes in the motor vehicle 1 path control setpoint in a turn and therefore to guarantee the comfort of the occupants of the vehicle 1.

Here the updated understeer gradient value $\nabla_{SV\_\delta t\_act}$ is a function of the first stored value $\phi^T \cdot Y$ and of the second stored value $\phi^T \cdot \phi$ determined in step E24, and therefore determined in the turn that the vehicle 1 has just exited. The updated value of the understeer gradient $\nabla_{SV\_\delta t\_act}$ is more particularly determined as the ratio between the first stored value $\phi^T \cdot Y$ and the second stored value $\phi^T \cdot \phi$:

$$\nabla_{SV\_\delta t\_act} = \frac{\Phi^T \Phi}{\Phi^T Y} \quad \text{[Math. 12]}$$

However, as it has been determined in step E20 that the travel time of the vehicle 1 in one or more turns had not reached the predetermined duration $\tau_{app}$, it is considered that the learning period of the method has not ended. The value of the understeer gradient $\nabla_{SV\_\delta t\_act}$ determined in step E28 is not considered optimal and must therefore be corrected.

To this end, step E30 is a step of correction of the value of the understeer gradient $\nabla_{SV\_\delta t\_act}$ determined in step E28 in order to determine an intermediate value of the understeer gradient $\nabla_{SV\_\delta t\_int}$. This intermediate value of the understeer gradient $\nabla_{SV\_\delta t\_int}$ is determined on the basis of a weighting between the value of the understeer gradient $\nabla_{SV\_\delta t\_act}$ determined in step E28 and the predetermined value $\nabla_{SV\_init}$ used in the initialization step E4. In other words, an adjustment factor is applied in order to limit understeer gradient value estimation errors if little turn data has been acquired. This adjustment during a learning period having a predetermined duration $\tau_{app}$ then makes possible linear and progressive convergence of the understeer gradient value in order to enable the generation of the most regular and fluid possible control setpoint (with no jolts felt by the occupants of the vehicle 1).

The method then continues with a step E32 of determination of a first acceleration value and of a second value of another acceleration of the vehicle 1 for the sampling increment concerned. Here for example the acceleration is the lateral acceleration of the vehicle 1 and the other acceleration is the transverse acceleration of the vehicle 1. The computer 12 thereafter determines the difference between the first acceleration and the second acceleration.

In step E34 this difference is compared to a predetermined acceleration threshold. This predetermined acceleration threshold makes it possible to identify a possible understeer gradient estimation error, such as could be observed in the event of loading a heavy weight into the motor vehicle 1 or in the event of a so-called tight turn (in which the lateral acceleration would be high). Here this predetermined acceleration threshold takes for example the form of a map. This map indicates for example that for a difference between the first acceleration and the second acceleration less than a predetermined threshold of approximately 0.2 m/s² no correction is applied to the intermediate value of the understeer gradient $\nabla_{SV\_\delta t\_int}$. The final value of the understeer gradient $\nabla_{SV\_\delta t\_fin}$ is therefore equal to the intermediate value of the understeer gradient $\nabla_{SV\_\delta t\_int}$ (step E36a).

However, if the difference between the first acceleration and the second acceleration is greater than this predetermined threshold of approximately 0.2 m/s² the intermediate value of the understeer gradient $\nabla_{SV\_\delta t\_int}$ is corrected by a correction value that is added to this intermediate value (step E36b). This correction value is provided for example by the aforementioned map. For a difference between the first acceleration and the second acceleration greater than 1 m/s² for example the understeer gradient correction value is of the order of $1.7 \cdot 10^{-3}$ rad·s²/m. The final value of the understeer gradient $\nabla_{SV\_\delta t\_fin}$ is therefore equal to the intermediate value of the understeer gradient $\nabla_{SV\_\delta t\_int}$ with this correction value added to it.

The computer 12 then uses the final value of the understeer gradient $\nabla_{SV\_\delta t\_fin}$ (corrected or not by the correction value) to determine the turning angle setpoint $\delta_{req}$ (using the equations introduced above) and therefore the motor vehicle 1 path control setpoint (step E38).

In a similar manner to that described for step E10 introduced above the anticipator element 24 more particularly uses the final value of the understeer gradient $\nabla_{SV\_\delta t\_fin}$ obtained in step E36a or E36b to determine the component $\delta_{FFD}$ of the required turning angle $\delta_{req}$. In parallel with this the observer element 26 estimates the other component $\delta_{FBK}$ of the required turning angle $\delta_{req}$. The turning angle $\delta_{req}$ setpoint is therefore obtained by summing these two components. This setpoint is then transmitted to the steering system of the motor vehicle 1.

The sampling increment is then incremented to execute the steps of the method for the next sampling increment (as indicated above the method is executed in a regular manner as the vehicle 1 moves in the traffic lane). The method therefore returns after this to step E6.

If in step E20 the computer 12 determines that while traveling in the traffic lane the motor vehicle 1 has traveled in one (or more) turns during a duration equal to at least the predetermined duration $\tau_{app}$, the method continues with step E40.

During this step E40 the computer 12 determines if a total duration Ttot of travel in one or more turns has been reached since the latest updating of the database. Here this total duration Ttot is greater than 50 seconds.

The total duration Ttot is for example proportional to the predetermined duration $\tau_{app}$ corresponding to the learning period. For a predetermined duration $\tau_{app}$ of 50 s the total duration Ttot is for example 100 s. In another example, for a predetermined duration of 30 s the total duration $\tau_{tot}$ is 70 s.

If the total duration $\tau_{tot}$ of traveling in a turn has not been reached since the last updating of the database the method continues with steps E42 and E44 respectively similar to the steps E22 and E24 described above. Following step E44 the computer 12 therefore memorizes a first stored value $\phi^T \cdot Y$ and a second stored value $\phi^T \cdot \phi$ in the database in the memory 14, these values being obtained from the measurements acquired for the current sampling increment δt.

As in step E26 described above, the computer 12 determines in step E46 if the motor vehicle 1 has exited the turn detected in step E6.

If this is not the case, that is to say if the motor vehicle 1 is still negotiating the turn detected in step E6, the method returns to step E20.

On the other hand, if the motor vehicle 1 has exited the turn that it was negotiating the method continues with step E48. This therefore means that the motor vehicle 1 is at present traveling in a straight line.

During this step E48 the computer 12 updates the value of the understeer gradient $\nabla_{SV\_\delta t\_act}$ that is used to determine the component $\delta_{FFD}$ in a similar manner to the step E28 described above.

As FIG. 3 shows, once this value of the understeer gradient has been updated the method continues with steps E50, E52, E54a and E54b enabling determination of the final value of the understeer gradient from the updated value of the understeer gradient $\nabla_{SV\_\delta t\_act}$ obtained in step E48 in a similar manner to that described above for steps E32, E34, E36a and E36b, respectively.

Then, in step E56, the computer 12 uses this final value of the understeer gradient $\nabla_{SV\_\delta t\_fin}$ (corrected or not by the correction value) to determine the turning angle setpoint $\delta_{req}$ (using the equations introduced above) and therefore the motor vehicle 1 path control setpoint (in a similar manner to step E38 described above).

The sampling increment is then incremented to execute the steps of the method for the next sampling increment (as indicated above, the method is executed in a regular manner when the vehicle 1 is moving in the traffic lane). The method therefore returns after this to step E6.

If in step E40 the total duration $\tau_{tot}$ of traveling in a turn has been reached since the last updating of the database the method continues with step E60, during which the database is updated.

At the start of step E60 the database stores the first stored value $\phi^T \cdot Y$ and the second stored value $\phi^T \cdot \phi$ determined for the previous sampling increment.

During step E60 the computer 12 therefore updates each of the first stored value $\phi^T \cdot Y$ and the second stored value $\phi^T \cdot \phi$.

In practice the computer 12 determines on the one hand a first intermediate value (respectively a second intermediate value) proportional to the first stored value $\phi^T \cdot Y$ (respectively to the second stored value $\phi^T \cdot \phi$). The coefficient of proportionality applied is for example a function of the ratio between the predetermined duration $\tau_{app}$ and the total duration $\tau_{tot}$.

For example, in the situation where the predetermined duration $\tau_{app}$ is equal to 50 s and the total duration $\tau_{tot}$ is equal to 100 s the coefficient of proportionality applied is ½. The first intermediate value (respectively the second intermediate value) is therefore equal to half the first stored value OT Y (respectively to half the second stored value $\phi^T \cdot \phi$).

In step E60 the first stored value OT Y and the second stored value $\phi^T \cdot \phi$ are therefore each respectively updated by the first intermediate value and the second intermediate value (by overwriting them). The labels "first stored value $\phi^T \cdot Y$" and "second stored value $\phi^T \cdot \phi$" are therefore retained following step E60.

As FIG. 3 shows the method then returns to step E40.

The invention claimed is:

1. A method for controlling a path of a motor vehicle traveling in a traffic lane, comprising:
   detecting a turn in the traffic lane, then, when the motor vehicle enters said turn;
   determining a first quantity and a second quantity for a plurality of successive sampling increments based on state variables characteristic of movement of the motor vehicle;
   determining a first stored value and a second stored value, said first stored value being a function of the first quantity determined for the current sampling increment and of first quantities determined for at least one preceding sampling increment of a plurality of preceding sampling increments, said second stored value being a function of the second quantity determined for the current sampling increment and of second quantities determined for at least one of the preceding sampling increments;
   saving in memory said first stored value and said second stored value determined for each sampling increment, then when the motor vehicle exits said turn:
   determining a value of an understeer gradient as a function of said first stored value and said second stored value saved in said memory;
   correcting the value of the understeer gradient in order to determine an intermediate value of the understeer gradient, said intermediate value of the understeer gradient being determined based on a weighting between the value of the understeer gradient that has been determined and a predetermined value; and
   determining a command for the motor vehicle based on the intermediate value of the understeer gradient.

2. The method as claimed in claim 1, in which the first stored value is a function of a sum of the first quantity determined for the current sampling increment and of first quantities determined for at least one of the preceding sampling increments and the second stored value is a function of a sum of the second quantity determined for the current sampling increment and of second quantities determined for at least one of the preceding sampling increments.

3. The method as claimed in claim 1, in which the state variables characteristic of a movement of the motor vehicle are a function of a component of a turning angle of a wheel of the motor vehicle, a curvature of the traffic lane, a speed of movement of the motor vehicle or a wheelbase of the motor vehicle.

4. The method as claimed in claim 1, in which the determining the value of the understeer gradient is executed from one turn to another turn negotiated by the motor vehicle.

5. The method as claimed in claim 1, in which the value of the understeer gradient is determined based on a ratio between the first stored value and the second stored value.

6. The method as claimed in claim 1, further comprising:
determining a first acceleration value and a second value of a second acceleration of the motor vehicle,
determining a difference between the first acceleration value and the second value of the second acceleration,
when the difference that has been determined is greater than a predetermined threshold, further correcting the value of the understeer gradient based on a correction value that is a function of said difference that has been determined.

7. The method as claimed in claim 1, in which detection of the turn depends on parameters characteristic of a movement of the motor vehicle, at least some of the parameters characteristic of the motor vehicle being chosen from an angle of a front wheel of the motor vehicle, a yaw speed of the motor vehicle, a lateral offset between a center of gravity of the motor vehicle and an ideal path, a transverse acceleration of the motor vehicle or a speed of movement of the motor vehicle.

8. The method as claimed in claim 1, in which the first quantity and the second quantity are determined using a recursive least squares method as a function of state variables characteristic of a movement of the motor vehicle.

9. The method as claimed in claim 1, in which the determining the command for the motor vehicle includes a substep of determining a component of a turning angle of a wheel of the motor vehicle.

10. A device for controlling a path of a motor vehicle traveling in a traffic lane, comprising:
a computer and a memory provided with a database having a finite number of locations, said computer being configured to:
detect a turn in the traffic lane, then, when the motor vehicle enters said turn;
determine a first quantity and a second quantity for a plurality of successive sampling increments, based on state variables characteristic of movement of the motor vehicle;
determine a first stored value and a second stored value, said first stored value being a function of the first quantity determined for the current sampling increment and of first quantities determined for at least one preceding sampling increment of a plurality of preceding sampling increments, said second stored value being a function of the second quantity determined for the current sampling increment and of second quantities determined for at least one of the preceding sampling increments;
save in memory said first stored value and said second stored value determined for each sampling increment, then when the motor vehicle exits said turn:
determine a value of an understeer gradient as a function of said first stored value and said second stored value saved in the memory;
correcting the value of the understeer gradient in order to determine an intermediate value of the understeer gradient, said intermediate value of the understeer gradient being determined based on a weighting between the value of the understeer gradient that has been determined and a predetermined value; and
determine a command for the motor vehicle based on the intermediate value of the understeer gradient.

11. A motor vehicle comprising:
a power train, a steering system, and the device as claimed in claim 10 configured to control the steering system.

* * * * *